US009251925B2

(12) United States Patent
Kang et al.

(10) Patent No.: US 9,251,925 B2
(45) Date of Patent: Feb. 2, 2016

(54) CONDUCTIVE PASTE FOR EXTERNAL ELECTRODES AND MULTILAYER CERAMIC ELECTRONIC COMPONENT USING THE SAME

(71) Applicant: SAMSUNG ELECTRO-MECHANICS CO., LTD., Suwon, Gyunggi-do (KR)

(72) Inventors: Bum Suk Kang, Gyunggi-do (KR); Hew Young Kim, Gyunggi-do (KR); Jeong Ryeol Kim, Gyunggi-do (KR); Chang Hoon Kim, Gyunggi-do (KR); Dong Hoon Kim, Gyunggi-do (KR); Doo Young Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 379 days.

(21) Appl. No.: 13/935,229

(22) Filed: Jul. 3, 2013

(65) Prior Publication Data

US 2014/0268485 A1 Sep. 18, 2014

(30) Foreign Application Priority Data

Mar. 14, 2013 (KR) .......................... 10-2013-0027531

(51) Int. Cl.
 *H01B 1/22* (2006.01)
 *H01G 4/30* (2006.01)
 *H01G 4/232* (2006.01)

(52) U.S. Cl.
 CPC ............... *H01B 1/22* (2013.01); *H01G 4/2325* (2013.01); *H01G 4/30* (2013.01)

(58) Field of Classification Search
 CPC .............. H01B 1/00; H01B 1/02; H01B 1/22; H01G 4/30; H05K 1/181; H05K 1/185
 See application file for complete search history.

(56) References Cited

U.S. PATENT DOCUMENTS

| 8,675,343 | B2* | 3/2014 | Park et al. ................. | H01B 1/22 252/512 |
| 2012/0037221 | A1* | 2/2012 | Kim et al. ................. | H01B 1/22 136/256 |
| 2013/0118572 | A1* | 5/2013 | Kim et al. ........... | H01L 31/0224 136/256 |
| 2013/0146135 | A1* | 6/2013 | Lee et al. ................. | H01B 1/22 136/256 |
| 2014/0312283 | A1* | 10/2014 | Park et al. .............. | H01B 1/023 252/513 |
| 2014/0345919 | A1* | 11/2014 | Kim et al. ................ | H01B 1/16 174/257 |

FOREIGN PATENT DOCUMENTS

| JP | 2002-270457 A | 9/2002 |
| KR | 2005-0048855 A | 5/2005 |

* cited by examiner

*Primary Examiner* — Mark Kopec
(74) *Attorney, Agent, or Firm* — McDermott Will & Emery LLP

(57) ABSTRACT

There are provided a conductive paste for external electrodes and a multilayer ceramic electronic component using the same. The conductive paste includes a conductive metal powder including conductive metal particles; and a conductive amorphous metal powder including amorphous metal particles having a(Si, B)-b(Li, K)-c(V, Mn) in which a+b+c=100, 20≤a≤60, 10≤b≤40, and 2≤c≤25 are satisfied.

14 Claims, 2 Drawing Sheets

CONDUCTIVE PASTE FOR EXTERNAL ELECTRODES AND MULTILAYER CERAMIC ELECTRONIC COMPONENT USING THE SAME

CROSS-REFERENCE TO RELATED APPLICATIONS

This application claims the priority of Korean Patent Application No. 10-2013-0027531 filed on Mar. 14, 2013, in the Korean Intellectual Property Office, the disclosure of which is incorporated herein by reference.

BACKGROUND OF THE INVENTION

1. Field of the Invention

The present invention relates to a conductive paste for external electrodes that may improve adhesive strength between external electrodes and a ceramic body and solve an issue of defective plating due to glass detachment, and a multilayer ceramic electronic component using the same.

2. Description of the Related Art

Recently, according to the trend for the miniturization of electronic products, a multilayer ceramic electronic component is required to be miniaturized and to have ever higher amounts of capacitance implemented therein.

To meet requirements for miniaturization and to achieve increased capacitance, external electrodes of the multilayer ceramic electronic component has been thinned.

An external electrode paste may ensure chip sealability and electrical connectivity with a chip using a conductive material such as copper (Cu) as a main material, and improve the adhesive strength between the external electrodes and the chip while filling an empty space with glass as an auxiliary material at the time of sintering contraction of the above-described material.

An oxide-based glass powder is typically used as the glass component in the external electrodes. Here, the external electrodes may be formed by applying the external electrode paste to ends of the chip and then sintering the applied external electrode paste. Thereafter, plated layers may be formed on the external electrodes through the sequential electroplating of nickel (Ni) and tin (Sn).

However, when the oxide-based glass powder is added to the external electrode paste, the following problems may arise.

First, internal electrodes may be covered with the glass in a sintering process, thereby degrading connectivity between the internal electrodes and the external electrodes.

Second, the glass may be eluted to the outside of the external electrodes in the sintering process, and therefore, defective plating may occur in a plating process after the sintering process.

In particular, by thinning the external electrodes, a desired level of density may be difficult to be implemented therein, and the possibiltiy of the occurrence of defects caused by deficient or excessive amounts of glass may be increased due to a high temperature behavior of glass.

RELATED ART DOCUMENT (Patent Document 1) Japanese Patent Laid-Open Publication No. 2002-270457

SUMMARY OF THE INVENTION

An aspect of the present invention provides a conductive paste for external electrodes that may improve adhesive strength between external electrodes and a ceramic body and solve the problem of defective plating due to glass detachment, and a multilayer ceramic electronic component using the same.

According to an aspect of the present invention, there is provided a conductive paste for external electrodes including: a conductive metal powder including conductive metal particles; and a conductive amorphous metal powder including amorphous metal particles having a(Si, B)-b(Li, K)-c(V, Mn) in which a+b+c=100, 20≤a≤60, 10≤b≤40, and 2≤c≤25 are satisfied.

An average particle diameter of the amorphous metal particles may range from 0.5 μm to 5.0 μm.

The amorphous metal particles may be provided in a content of 20% to 50% by volume, relative to 100% by volume of the conductive metal particles.

The conductive metal particles may include at least one selected from the group consisting of copper (Cu), nickel (Ni), silver (Ag), and silver-palladium (Ag—Pd).

The conductive metal particles may include a mixture of spherical metal particles and metal flakes.

An average diameter of the spherical metal particles may be 100 nm to 5 μm, and an average diameter of the metal flakes may be 100 nm to 6 μm.

According to another aspect of the present invention, there is provided a multilayer ceramic electronic component including: a ceramic body including a dielectric layer; first and second internal electrodes disposed to face each other within the ceramic body with the dielectric layer interposed therebetween; and a first external electrode electrically connected to the first internal electrode and a second external electrode electrically connected to the second internal electrode, wherein the first and second external electrodes are formed by applying a conductive paste for external electrodes to the ceramic body, the conductive paste including a conductive metal powder including conductive metal particles and a conductive amorphous metal powder including amorphous metal particles having a (Si, B)-b (Li, K)-c (V, Mn) in which a+b+c=100, 20≤a≤60, 10≤b≤40, and 2≤c≤25 are satisfied.

The multilayer ceramic electronic component may further include a reaction layer formed between the ceramic body and the first and second external electrodes through a reaction between the ceramic body and the conductive amorphous metal powder.

A thickness of the reaction layer may range from 1 μm to 100 μm.

An average particle diameter of the amorphous metal particles may range from 0.5 μm to 5.0 μm.

The amorphous metal particles may be provided in a content of 20% to 50% by volume, relative to 100% by volume of the conductive metal particles.

The conductive metal particles may include at least one selected from the group consisting of copper (Cu), nickel (Ni), silver (Ag), and silver-palladium (Ag—Pd).

The conductive metal particles may include a mixture of spherical metal particles and metal flakes.

An average diameter of the spherical metal particles may be 100 nm to 5 μm, and an average diameter of the metal flakes may be 100 nm to 6 μm.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
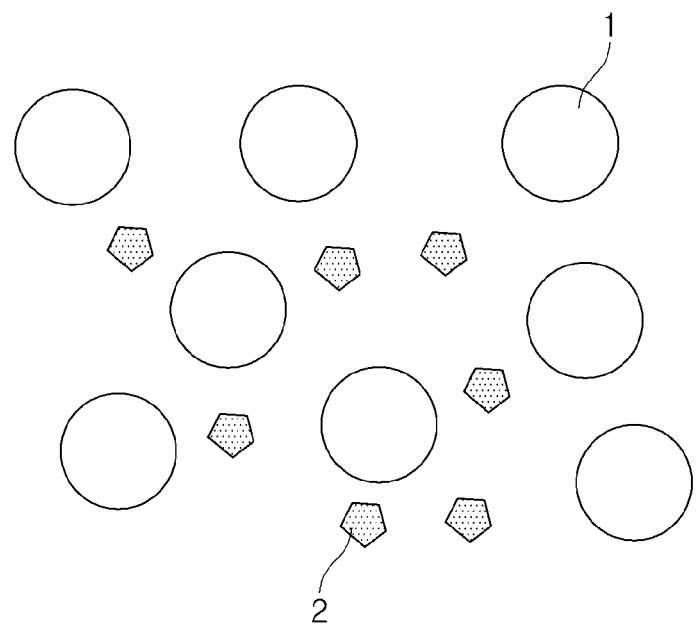
FIG. 1 is a schematic diagram showing a conductive paste for external electrodes according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a schematic diagram showing a conductive paste for external electrodes according to an embodiment of the present invention.

Referring to FIG. 1, a conductive paste for external electrodes according to an embodiment of the invention may include a conductive metal powder including conductive metal particles 1 and a conductive amorphous metal powder including amorphous metal particles 2 including a(Si, B)-b(Li, K)-c(V, Mn) in which a+b+c=100, 20≤a≤60, 10≤b≤40, and 2≤c≤25 are satisfied.

An average particle diameter of the amorphous metal particles 2 may range from 0.5 μm to 5.0 μm.

The amorphous metal particles 2 may be provided in a content of 20% to 50% by volume, relative to 100% by volume of the conductive metal particles 1.

The conductive metal particles 1 may be formed of at least one selected from the group consisting of copper (Cu), nickel (Ni), silver (Ag), and silver-palladium (Ag—Pd).

The conductive metal particles 1 may be a mixture of spherical metal particles and metal flakes.

An average diameter of the spherical metal particles may range from 100 nm to 5 μm, and an average diameter of the metal flakes may range from 100 nm to 6 μm.

The conductive paste for external electrodes may include the conductive metal particles 1 and the conductive amorphous metal particles 2 including a(Si, B)-b(Li, K)-c(V, Mn) in which a+b+c=100, 20≤a≤60, 10≤b≤40, and 2≤c≤25 are satisfied. In addition, the conductive paste for external electrodes may further include an organic binder and an organic vehicle containing an organic solvent.

A material of the conductive metal particles 1 is not particularly limited, as long as the material can form electrical connections with a first internal electrode and a second internal electrode so as to form capacitance. For example, the conductive metal particles may be formed of at least one selected from the group consisting of copper (Cu), nickel (Ni), silver (Ag), and silver-palladium (Ag—Pd).

The conductive metal particles 1 may be a mixture of spherical metal particles and metal flakes, but are not limited thereto.

The spherical metal particles are not particularly limited, but may be defined as particles having a length ratio (long axis/short axis) of a long axis to a short axis of, for example, 1.45 or less.

Meanwhile, the metal flakes may be defined as particles having a ratio (long axis/short axis) of 1.95 or greater, but are not limited thereto.

Figure 3:
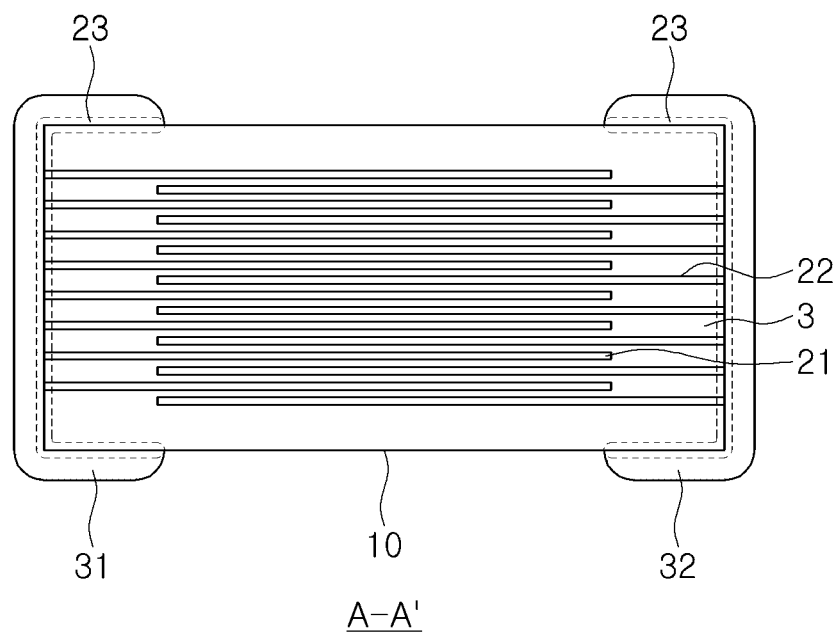
FIG. 3 is a cross-sectional view taken along line A-A' of FIG. 1.

A method of measuring the long axis and the short axis of the spherical metal particles and the metal flakes may be performed by scanning an image of a longitudinal cross-section of a multilayer ceramic capacitor using a scanning electron microscope (SEM) as shown in FIG. 3.

Specifically, as shown in FIG. 3, with respect to an external electrode region extracted from an image captured using the SEM, obtained by scanning a cross-section of the multilayer ceramic capacitor taken in length and thickness (L-T) directions cut in a central portion of the multilayer ceramic capacitor in a width (W) direction thereof, long axis lengths and short axis lengths of the spherical metal particles and the metal flakes, observed in a region 10 μm×10 μm square, may be measured.

According to the embodiment of the invention, since the conductive metal particles 1 include a mixture of the spherical metal particles and the metal flakes, sinterability may be improved and an excellent effect of ensuring coverage may be obtained.

An average diameter of the spherical metal particles may range from 100 nm to 5 μm, and an average diameter of the metal flakes may range from 100 nm to 6 μm, but the sizes of the spherical metal particles and the metal flakes are not limited thereto.

The conductive metal particles 1 include the spherical metal particles having the diameter of 100 nm to 5 μm, and the metal flakes having the diameter of 100 nm to 6 μm, and therefore, excellent sinterability may be obtained, and an empty region may be filled in a sintering process, thereby obtaining excellent coverage of the external electrodes.

Meanwhile, the amorphous metal particles 2 may include a(Si, B)-b(Li, K)-c(V, Mn) in which a+b+c=100, 20≤a≤60, 10≤b≤40, and 2≤c≤25 are satisfied.

The amorphous metal powder is a conductive material, evenly melted between the external electrodes and the ceramic body in the sintering process, whereby strong adhesive force between the external electrodes and the ceramic body may be achieved.

In addition, the amorphous metal powder may be significantly effective for hermetic sealing of ends of the ceramic body including the internal electrodes.

The amorphous metal is a conductive metal, and may enable electrical connections to be formed between the external electrodes and the internal electrodes, even in the case that the internal electrodes are covered with the amorphous metal melted in the sintering process, unlike an oxide-based glass.

In addition, unlike the oxide-based glass, since the amorphous metal has conductive properties, a plated layer may be formed even in the case that the melted amorphous metal is eluted to the outside of the external electrodes in the sintering process.

In addition, as described below, in a case in which the multilayer ceramic capacitor is fabricated using the conductive paste for external electrodes, a reaction layer may be formed on a boundary surface between the ceramic body and the external electrode, whereby strong adhesive force between the external electrode and the ceramic body may be achieved.

In addition, the hermetic sealing of the ends of the ceramic body including the internal electrodes may be improved due to the presence of the reaction layer.

Detailed descriptions of the reaction layer will further be made in a multilayer ceramic electronic component according to another embodiment of the invention which will later be described.

The amorphous metal powder according to an embodiment of the invention may include a material represented by a(Si, B)-b(Li, K)-c(V, Mn), so that electrical connections between the internal electrodes and the external electrodes may be formed, and a plated layer may be formed even at the time of elution.

In order for the amorphous metal powder to be evenly adhered to the ceramic body at a high temperature of 400° C. to 1000° C., glass stability and a wetting temperature may be important.

Glass stability ($\Delta T$) may be represented by a difference between a crystallization temperature (Tc) and a glass transition temperature (Tg), that is, $\Delta T=Tc-Tg$.

The glass stability ($\Delta T$) may be an important factor in terms of ensuring the stable behavior of glass in a viscous state at a temperature sufficient to adhere the amorphous metal powder and the ceramic body to each other, and according to an embodiment of the invention, the stability of glass in the amorphous metal powder should be about 50° C. or higher so that sufficient adhesive force between the ceramic body and the external electrodes may be obtained.

The wetting temperature (Twet) may be related to detachment of the amorphous metal powder. When the wetting temperature between the conducive metal powder and the amorphous metal powder within the external electrode paste is relatively higher than an electrode sintering temperature, the amorphous metal powder in a melted state may be eluted to the outside of the external electrodes in the sintering process.

In addition, when the wetting temperature between the conducive metal powder and the amorphous metal powder is significantly lower than the electrode sintering temperature, the amorphous metal powder may first be softened and melted to cover the internal electrodes even before an alloy reaction between the internal electrodes and the external electrodes, thereby degrading connectivity between the internal electrodes and the external electrodes.

Therefore, according to the embodiment of the invention, a+b+c=100, 20≤a≤60, 10≤b≤40, and 2≤c≤25 are satisfied, whereby the amorphous metal powder between the external electrodes and the ceramic body may be evenly melted in the sintering process to achieve strong adhesive force therebetween.

An average particle diameter of the amorphous metal particles 2 is not particularly limited, but may range from 0.5 μm to 5.0 μm.

When the average particle diameter of the amorphous metal particles 2 is less than 0.5 μm, the amorphous metal powder may first be softened and melted to cover the internal electrodes, thereby degrading connectivity between the internal electrodes and the external electrodes.

In addition, when the average particle diameter of the amorphous metal particles 2 exceeds 5.0 μm, the amorphous metal powder may be eluted to the outside of the external electrodes in the sintering process.

The amorphous metal particles 2 may be provided in a content of 20% to 50% by volume, relative to 100% by volume of the conductive metal particles 1.

According to the embodiment of the invention, since the conductive paste for external electrodes includes the amorphous metal particles 2, a problem that may happen in the case that the conductive paste includes an inorganic material such as glass may not occur, and therefore, the amorphous metal particles 2 may be provided in a content of 20% to 50% by volume, relative to 100% by volume of the conductive metal particles.

Specifically, according to the embodiment of the invention, problems in which the internal electrodes are covered with glass in the sintering process to degrade connectivity between the internal electrodes and the external electrodes and in which glass is eluted to the outside of the external electrodes in the sintering process to cause defective plating in a plating process after the sintering, which may happen in the case that the conductive paste includes an excessive amount of glass, may not occur.

Therefore, according to the embodiment of the invention, the amorphous metal particles 2 may be provided in a content of 20% to 50% by volume, relative to 100% by volume of the conductive metal particles 1.

When the amorphous metal particles 2 are provided in a content of 20% or less by volume, relative to 100% by volume of the conductive metal particles 1, chip sealability may be reduced due to the reduced content of the amorphous metal particles.

In addition, when the amorphous metal particles 2 are provided in a content of 50% or more by volume, relative to 100% by volume of the conductive metal particles 1, connectivity between the internal electrodes and the external electrodes may be degraded due to the excessive amount of the amorphous metal particles.

Figure 2:
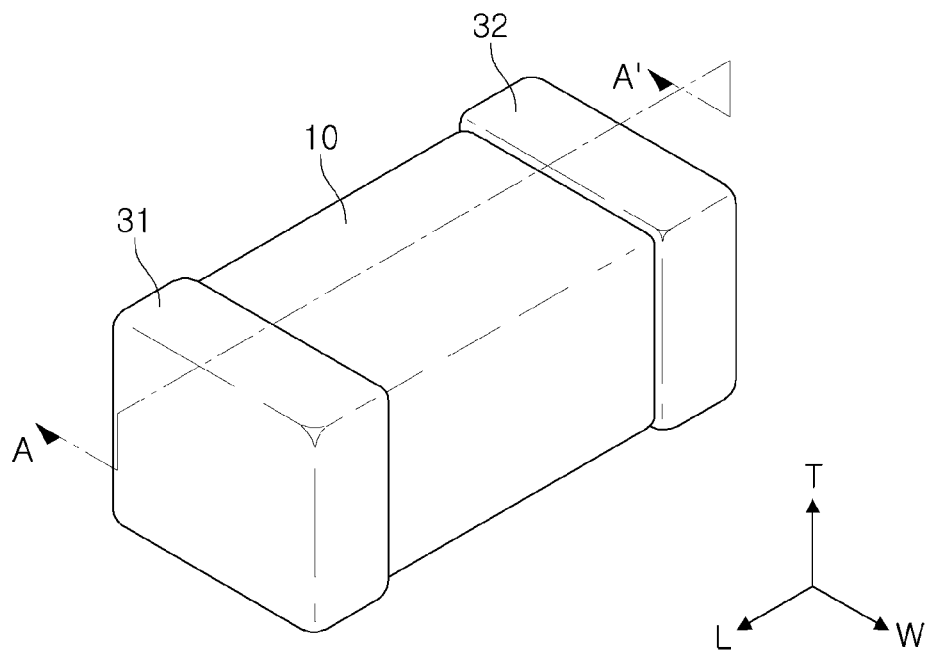
FIG. 2 is a perspective view schematically showing a multilayer ceramic capacitor according to another embodiment of the present invention.

FIG. 2 is a perspective view schematically showing a multilayer ceramic capacitor according to another embodiment of the present invention, and FIG. 3 is a cross-sectional view taken along line A-A' of FIG. 1.

Referring to FIGS. 2 and 3, the multilayer ceramic electronic component according to another embodiment of the invention may include a ceramic body 10 including a dielectric layer 3, first and second internal electrodes 21 and 22 disposed to face each other with the dielectric layer 3 interposed therebetween within the ceramic body 10, and a first external electrode 31 electrically connected to the first internal electrode 21 and a second external electrode 32 electrically connected to the second internal electrode 22. Here, the first and second external electrodes 31 and 32 may be formed by applying a conductive paste for external electrodes to external surfaces of the ceramic body, the conductive paste including a conductive metal powder and a conductive amorphous metal powder including a (Si, B)-b (Li, K)-c (V, Mn) in which a+b+c=100, 20≤a≤60, 10≤b≤40, and 2≤c≤25 are satisfied.

Hereinafter, the multilayer ceramic electronic component according to another embodiment of the invention will be described using a multilayer ceramic capacitor as an example, but is not limited thereto.

In the multilayer ceramic electronic component according to another embodiment of the invention, a "length direction," a "width direction," and a "thickness direction" may denote an "L" direction, a "W" direction, and a "T" direction of FIG. 1, respectively. Here, the "thickness direction" may be used as having the same meaning as a direction in which dielectric layers are stacked, that is, a "stacking direction".

According to this embodiment of the invention, a material of the dielectric layer 3 is not particularly limited as long as sufficient capacitance can be obtained with the use thereof, and may be, for example, barium titanate ($BaTiO_3$) powder.

As the material of the dielectric layer 3, a variety of ceramic additives, organic solvents, plasticizers, binders, dispersants, and the like may be added to a powder formed of a material such as barium titanate ($BaTiO_3$) or the like, depending on the purpose of the present invention.

Materials of the first and second internal electrodes 21 and 22 are not particularly limited, and for example, a conductive paste including at least one of silver (Ag), lead (Pb), platinum (Pt), nickel (Ni), and copper (Cu) may be used.

The multilayer ceramic capacitor according to the embodiment of the invention may include the first external electrode 31 electrically connected to the first internal electrode 21 and the second external electrode 32 electrically connected to the second internal electrode 22.

In order to form capacitance, the first and second external electrodes 31 and 32 may be electrically connected to the first and second internal electrodes 21 and 22, and the second external electrode 32 may have a polarity different to that of the first external electrode 31.

According to this embodiment of the invention, the first and second external electrodes 31 and 32 may be formed by applying the conductive paste for external electrodes to the external surfaces of the ceramic body, the conductive paste including the conductive metal powder and the conductive amorphous metal powder including a (Si, B)-b (Li, K)-c (V, Mn) in which $a+b+c=100$, $20 \leq a \leq 60$, $10 \leq b \leq 40$, and $2 \leq c \leq 25$ are satisfied.

The characteristics of the conductive paste for external electrodes are the same as those of the conductive paste according to the above-described embodiment of the invention, and thus, repeated descriptions thereof will be omitted.

According to the embodiment of the invention, the multilayer ceramic capacitor may further include a reaction layer 23 that is formed between the ceramic body 10 and the first and second external electrodes 31 and 32 through a reaction between the ceramic body 10 and the conductive amorphous metal powder.

In a case in which the multilayer ceramic capacitor is fabricated using the conductive paste for external electrodes, the reaction layer 23 may be formed on a boundary surface between the ceramic body 10 and the first and second external electrodes 31 and 32, whereby strong adhesive force between the first and second external electrodes 31 and 32 and the ceramic body 10 may be achieved.

In addition, hermetic sealing of ends of the ceramic body 10 including the internal electrodes may be superior due to the presence of the reaction layer 23.

In addition, unlike general oxide-based glass, the conductive amorphous metal forming the reaction layer 23 allows for active mass transfer between the ceramic body 10 and the first and second external electrodes 31 and 33, and therefore the formation of pores at the interface may be suppressed, thereby preventing degradation in reliability due to penetration of a plating solution that may occur during the plating process.

In addition, unlike general oxide-based glass, the conductive amorphous metal forming the reaction layer 23 may be diffused into the dielectric layer 3 without remaining in a liquid state on the interface, thereby preventing a capacitance reduction problem due to degradation in connectivity between the internal electrodes and the external electrodes that may occur due to a higher sintering temperature.

A thickness of the reaction layer 23 is not particularly limited, but for example, may range from 1 μm to 100 μm.

When the thickness of the reaction layer 23 is less than 1 μm, adhesive force between the first and second external electrodes 31 and 32 and the ceramic body 10 may be reduced, or a hermetic sealing effect may be degraded.

When the thickness of the reaction layer 23 exceeds 100 μm, a target capacitance may be difficult to be implemented due to the significantly thick reaction layer 23.

According to the embodiment of the invention, an amount of dissolved oxygen in the first and second external electrodes 31 and 32 may be 100 ppm or less.

Since the first and second external electrodes 31 and include the conductive amorphous metal instead of the oxide-based glass, a significantly small amount of dissolved oxygen may exist therein.

Specifically, according to the embodiment of the invention, since the conductive paste does not include the oxide-based glass when forming the external electrodes, oxygen from the oxide-based glass may not exist within the external electrodes.

Oxygen may be generated due to an inevitable reaction in the process of forming the external electrodes, but a significantly small amount of oxygen is generated. Therefore, an amount of dissolved oxygen in the first and second external electrodes 31 and 32 may be 100 ppm or less.

Meanwhile, a method of fabricating a multilayer ceramic electronic component according to another embodiment of the invention may include preparing a ceramic body including a dielectric layer and first and second internal electrodes disposed to face each other with the dielectric layer interposed therebetween, preparing a conductive paste for external electrodes including a conductive metal powder and a conductive amorphous metal powder including a(Si, B)-b(Li, K)-c(V, Mn) in which $a+b+c=100$, $20 \leq a \leq 60$, $10 \leq b \leq 40$, and $2 \leq c \leq 25$ are satisfied, applying the conductive paste for external electrodes to the ceramic body so as to be electrically connected to the first and second internal electrodes, and forming first and second external electrodes by sintering the ceramic body.

In the method of fabricating the multilayer ceramic electronic component according to another embodiment of the invention, repeated descriptions of elements of the above-described multilayer ceramic electronic component will be omitted.

Hereinafter, the method of fabricating the multilayer ceramic electronic component according to another embodiment of the invention will be described using a multilayer ceramic capacitor as an example, but is not limited thereto.

First, the ceramic body 10 including the dielectric layer 3 and the first and second internal electrodes 21 and 22 disposed to face each other with the dielectric layer 3 interposed therebetween may be prepared.

The dielectric layer 3 may be formed of a ceramic green sheet fabricated to have a thickness of several μm in such a manner that slurry formed by mixing a powder formed of a material such as barium titanate ($BaTiO_3$) with a ceramic additive, an organic solvent, a plasticizer, a binder, and a dispersant, using a basket mill, is applied to a carrier film and dried.

Internal electrodes may be formed using a conductive paste while the conductive paste is dispensed onto the green sheets and a squeegee spreads the conductive paste in one direction.

Here, the conductive paste may be made of at least one of a precious metal such as silver (Ag), lead (Pd), platinum (Pt), or the like, nickel (Ni), and copper (Cu), or an alloy of at least two thereof.

After the internal electrodes are formed, the green sheets may be separated from the carrier films, and then be stacked to form a stacked body.

Next, the stacked body may be compressed under conditions of high temperature and high pressure, and then the compressed body may be cut into chips having a predetermined size, whereby a ceramic body may be prepared.

Next, the conductive paste for external electrodes including the conductive metal powder and the conductive amorphous metal powder including a(Si, B)-b(Li, K)-c(V, Mn) in which a+b+c=100, 20≤a≤60, 10≤b≤40, and 2≤c≤25 are satisfied may be prepared.

The conductive metal particles may include at least one selected from the group consisting of copper (Cu), nickel (Ni), silver (Ag), and silver-palladium (Ag—Pd).

An average particle diameter of the amorphous metal particles may range from 0.5 μm to 5.0 μm.

The amorphous metal particles may be provided in a content of 20% to 50% by volume, relative to 100% by volume of the conductive metal particles.

Next, the conductive paste for external electrodes may be applied to the ceramic body 10 so as to be electrically connected to the first and second internal electrodes 21 and 22.

Finally, the first and second external electrodes 31 and 32 may be formed by sintering the ceramic body 10.

Hereinafter, inventive and comparative examples will be described in detail, but the present invention is not limited thereto.

Next, a conductive paste for internal electrodes including nickel particles having an average particle size of 0.05 μm to 0.2 μm was prepared.

The conductive paste for internal electrodes was applied to the green sheets by a screen printing method to form the internal electrodes, and then a stacked body was fabricated by stacking the green sheets in an amount of 200 layers.

Next, the stacked body was compressed and cut to obtain a chip having a standard 0603 size, and the chip was sintered at a temperature of 1050° C. to 1200° C. in a reduction atmosphere of $H_2$ 0.1% or less.

Then, external electrodes were formed using a conductive paste for external electrodes to which a variety of compositions of the conductive amorphous metal powder were applied, and were subjected to a plating process, whereby multilayer ceramic capacitors were fabricated.

In the following Table 1, adhesive force, reductions in capacitance, and reliability levels are compared in accordance with different compositions and contents of the conductive amorphous metal included in the conductive paste for external electrodes of the multilayer ceramic capacitors.

TABLE 1

| | | Comparative Example 1 | Comparative Example 2 | Inventive Example 1 | Inventive Example 2 | Inventive Example 3 | Inventive Example 4 | Inventive Example 5 | Inventive Example 6 | Comparative Example 3 | Comparative Example 4 | Comparative Example 5 |
|---|---|---|---|---|---|---|---|---|---|---|---|---|
| Composition of Amorphous Metal (mol %) | B | 40 | 10 | 20 | 40 | 0 | 45 | 50 | 25 | 35 | 30 | 15 |
| | Si | 30 | 60 | 30 | 18 | 45 | 0 | 0 | 30 | 5 | 30 | 25 |
| | Li | 15 | 5 | 25 | 30 | 35 | 30 | 30 | 20 | 40 | 30 | 20 |
| | K | 15 | 10 | 5 | 10 | 5 | 10 | 10 | 10 | 10 | 10 | 10 |
| | V | | 10 | 10 | 1 | 5 | 10 | 7 | 50 | 5 | 0.5 | 15 |
| | Mn | | 5 | 10 | 1 | 10 | 5 | 3 | 10 | 5 | 0.5 | 15 |
| | Total | 100 | 100 | 100 | 100 | 100 | 100 | 100 | 100 | 100 | 100 | 100 |
| Paste Estimation Result | Adhesive force | X | X | ○ | ○ | ○ | ○ | ○ | ○ | ○ | X | X |
| | Reliability | X | X | ○ | ○ | ○ | ○ | ○ | ○ | ○ | X | X |
| | Capacitance Reduction | ○ | ○ | ○ | ○ | ○ | ○ | ○ | ○ | X | ○ | X |
| | Final Decision | X | X | ○ | ○ | ○ | ○ | ○ | ○ | X | X | X |

Note 1)
adhesive force estimation standard: X denotes bad, ○ denotes excellent

Note 2)
reliability estimation standard: X denotes bad, ○ denotes excellent

Note 3)
capacitance reduction estimation standard: X denotes bad, ○ denotes excellent In the Examples, with respect to multilayer ceramic capacitors including first and second external electrodes formed of a conductive metal powder and a conductive amorphous metal powder including a(Si, B)-b(Li, K)-c(V, Mn) in which a+b+c=100, 20≤a≤60, 10≤b≤40, and 2≤c≤25 are satisfied, tests were conducted to determine whether capacitance is reduced or whether defective plating occurs.

Here, the multilayer ceramic capacitors were fabricated in the following process.

First, slurry including barium titanate ($BaTiO_3$) powder was applied to carrier films and dried to prepare a plurality of ceramic green sheets, whereby dielectric layers were formed.

The dielectric layer was fabricated to have a thickness of 1 μm or less after sintering.

Referring to Table 1, in Comparative Example 1, a general paste for external electrodes including oxide-based glass was used, and it can be seen that problems such as a reduction in capacitance and adhesive force in the electrode sintering occurred.

In Comparative Example 2, the content of Si and B in the composition of a(Si, B)-b(Li, K)-c(V, Mn) was outside of a numerical value range of the present invention, and it can be seen that reliability was degraded.

On the other hand, Inventive Examples 1 and 2 satisfied the numerical value range of the present invention, and the reaction layer was formed on the ceramic body and the electronic electrodes, and therefore it can be seen that excellent adhesive force was obtained, and problems such as a reduction in capacitance or degradation in reliability did not occur, whereby excellent results were obtained.

Inventive Examples 3 to 6 satisfied the numerical value range of the present invention, and the reaction layer was formed on the ceramic body and the external electrodes, and therefore it can be seen that excellent adhesive force was obtained, and problems such as a reduction in capacitance or degradation in reliability did not occur, whereby excellent results were obtained.

Meanwhile, in Comparative Example 3, the content of Li and K in the composition of a(Si, B)-b(Li, K)-c(V, Mn) was outside of the numerical value range of the present invention, a liquid substance remained on the interface between the external electrodes and the ceramic body, and a reduction in capacitance occurred.

In Comparative Example 4, the content of V and Mn in the composition of a(Si, B)-b(Li, K)-c(V, Mn) was outside of the numerical value range of the present invention, and the reaction layer was not formed, and therefore it can be seen that a problem with adhesive force occurred, to cause the degradation of reliability.

In Comparative Example 5, the content of V and Mn in the composition of a(Si, B)-b(Li, K)-c(V, Mn) was outside of the numerical value range of the present invention, an excessive amount of the reaction layer was formed, and therefore, capacitance formation and adhesive force were problematic to thereby cause the degradation of reliability.

Consequently, according to an embodiment of the present invention, the first and second external electrodes include the conductive metal powder and the conductive amorphous metal powder including a(Si, B)-b(Li, K)-c(V, Mn) in which a+b+c=100, 20≤a≤60, 10≤b≤40, and 2≤c≤25 are satisfied, and therefore the multilayer ceramic electronic component may address problems such as the reduction in adhesive force between the ceramic body and the external electrodes, the degradation of electrode connectivity, and the degradation of reliability that can be easily caused after sintering the electrodes.

As set forth above, according to embodiments of the present invention, external electrodes may be formed using conductive amorphous metal powder, and therefore a multilayer ceramic electronic component can address problems such as degradation in conductivity between the internal electrodes and the external electrodes and detective plating due to glass detachment.

While the present invention has been shown and described in connection with the embodiments, it will be apparent to those skilled in the art that modifications and variations can be made without departing from the spirit and scope of the invention as defined by the appended claims.

What is claimed is:

1. A conductive paste for external electrodes, the conductive paste comprising:
a conductive metal powder including conductive metal particles; and
a conductive amorphous metal powder including amorphous metal particles having a(Si, B)-b(Li, K)-c(V, Mn) in which a+b+c=100 mol %, 20≤a≤60, 10≤b≤40, and 2≤c≤25 are satisfied.

2. The conductive paste of claim 1, wherein an average particle diameter of the amorphous metal particles ranges from 0.5 μm to 5.0 μm.

3. The conductive paste of claim 1, wherein the amorphous metal particles are provided in a content of 20% to 50% by volume, relative to 100% by volume of the conductive metal particles.

4. The conductive paste of claim 1, wherein the conductive metal particles include at least one selected from the group consisting of copper (Cu), nickel (Ni), silver (Ag), and silver-palladium (Ag—Pd).

5. The conductive paste of claim 1, wherein the conductive metal particles include a mixture of spherical metal particles and metal flakes.

6. The conductive paste of claim 5, wherein an average diameter of the spherical metal particles is 100 nm to 5 μm, and
an average diameter of the metal flakes is 100 nm to 6 μm.

7. A multilayer ceramic electronic component comprising:
a ceramic body including a dielectric layer;
first and second internal electrodes disposed to face each other within the ceramic body with the dielectric layer interposed therebetween; and
a first external electrode electrically connected to the first internal electrode and a second external electrode electrically connected to the second internal electrode,
wherein the first and second external electrodes are formed by applying a conductive paste for external electrodes to the ceramic body, the conductive paste including a conductive metal powder including conductive metal particles and a conductive amorphous metal powder including amorphous metal particles having a (Si, B)-b (Li, K)-c (V, Mn) in which a+b+c=100 mol %, 20≤a≤60, 10≤b≤40, and 2≤c≤25 are satisfied.

8. The multilayer ceramic electronic component of claim 7, further comprising a reaction layer formed between the ceramic body and the first and second external electrodes through a reaction between the ceramic body and the conductive amorphous metal powder.

9. The multilayer ceramic electronic component of claim 8, wherein a thickness of the reaction layer ranges from 1 μm to 100 μm.

10. The multilayer ceramic electronic component of claim 7, wherein an average particle diameter of the amorphous metal particles ranges from 0.5 μm to 5.0 μm.

11. The multilayer ceramic electronic component of claim 7, wherein the amorphous metal particles are provided in a content of 20% to 50% by volume, relative to 100% by volume of the conductive metal particles.

12. The multilayer ceramic electronic component of claim 7, wherein the conductive metal particles include at least one selected from the group consisting of copper (Cu), nickel (Ni), silver (Ag), and silver-palladium (Ag—Pd).

13. The multilayer ceramic electronic component of claim 7, wherein the conductive metal particles include a mixture of spherical metal particles and metal flakes.

14. The multilayer ceramic electronic component of claim 13, wherein an average diameter of the spherical metal particles is 100 nm to 5 μm, and
an average diameter of the metal flakes is 100 nm to 6 μm.

* * * * *